United States Patent
Wang et al.

(10) Patent No.: US 10,722,936 B2
(45) Date of Patent: Jul. 28, 2020

(54) RIVET BONDING WORKPIECE STACK-UPS HAVING ONE OR MORE POLYMER COMPOSITE WORKPIECES

(71) Applicant: GM GLOBAL TECHNOLOGY OPERATIONS LLC, Detroit, MI (US)

(72) Inventors: Pei-chung Wang, Troy, MI (US); Bradley J. Blaski, Sterling Heights, MI (US); Richard C. Janis, Grosse Pointe Woods, MI (US); Mark A. Voss, Richmond, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 223 days.

(21) Appl. No.: 15/888,591

(22) Filed: Feb. 5, 2018

(65) Prior Publication Data
US 2019/0240723 A1    Aug. 8, 2019

(51) Int. Cl.
*B29C 65/72*    (2006.01)
*B29C 65/56*    (2006.01)
(Continued)

(52) U.S. Cl.
CPC ........... *B21J 15/147* (2013.01); *B21J 15/022* (2013.01); *B21J 15/025* (2013.01); *B21J 15/28* (2013.01);
(Continued)

(58) Field of Classification Search
CPC ...... B21J 15/147; B21J 15/022; B21J 15/025; B29C 66/91445; B29C 66/0242; B29C 65/36; B29C 65/72; B29C 65/562; B29C 65/8215; B29C 66/8246; B29C 66/919; B29C 66/8322; B29C 65/10; B29C 65/1409; B29C 65/60; B29C 65/52; B29C 66/721; B29C 66/73; B29C 66/921; B29L 2031/3055; B29L 2031/3076; B29L 2031/3067; B29K 2105/243; B29K 2077/00; B29K 2307/04; B29K 2995/0086; B32B 7/08; B32B 7/12; B32B 27/34; B32B 27/08; B32B 37/1207; B32B 37/182; B32B 38/00; B32B 2037/1215; B32B 2037/1269; B32B 2250/02; B32B 2250/24; B32B 2262/106; B32B 2305/30; B32B 2305/72;
(Continued)

(56) References Cited

U.S. PATENT DOCUMENTS

| | | | |
|---|---|---|---|
| 8,739,388 B2 * | 6/2014 | Campbell | B32B 7/08 29/521 |
| 2008/0149256 A1 * | 6/2008 | Wang | B21J 15/36 156/92 |

(Continued)

*Primary Examiner* — Bayan Salone
(74) *Attorney, Agent, or Firm* — Reising Ethington, P.C.

(57) ABSTRACT

A method of rivet bonding a workpiece stack-up that includes one or more polymer composite workpieces, such as carbon fiber composite workpieces, involves several steps. In one step, adhesive is applied to a surface of the workpiece stack-up. In another step, workpieces—including the polymer composite workpiece(s)—are brought together. In yet another step the adhesive is partially or more cured. A rivet is installed through the workpiece stack-up and through the adhesive in another step. The method strengthens the resulting rivet-bonded joint by minimizing or altogether precluding fracture, cracking, and/or delamination thereat.

20 Claims, 5 Drawing Sheets

(51) Int. Cl.
| | |
|---|---|
| B29C 65/82 | (2006.01) |
| B29C 65/36 | (2006.01) |
| B29C 65/48 | (2006.01) |
| B29C 65/60 | (2006.01) |
| B21J 15/02 | (2006.01) |
| B21J 15/14 | (2006.01) |
| B21J 15/28 | (2006.01) |
| B62D 65/02 | (2006.01) |
| B29C 65/00 | (2006.01) |
| B29C 65/02 | (2006.01) |
| B32B 7/08 | (2019.01) |
| B32B 7/12 | (2006.01) |
| B32B 27/08 | (2006.01) |
| B32B 27/20 | (2006.01) |
| B32B 27/34 | (2006.01) |
| B32B 37/12 | (2006.01) |
| B32B 37/18 | (2006.01) |
| B32B 38/00 | (2006.01) |
| B29L 31/30 | (2006.01) |
| B29K 105/24 | (2006.01) |
| B29C 65/10 | (2006.01) |
| B29C 65/14 | (2006.01) |
| B29K 77/00 | (2006.01) |
| B29K 307/04 | (2006.01) |

(52) U.S. Cl.
CPC ............. *B29C 65/02* (2013.01); *B29C 65/36* (2013.01); *B29C 65/485* (2013.01); *B29C 65/562* (2013.01); *B29C 65/601* (2013.01); *B29C 65/72* (2013.01); *B29C 65/8215* (2013.01); *B29C 66/0242* (2013.01); *B29C 66/1122* (2013.01); *B29C 66/45* (2013.01); *B29C 66/71* (2013.01); *B29C 66/7212* (2013.01); *B29C 66/73921* (2013.01); *B29C 66/91445* (2013.01); *B32B 7/08* (2013.01); *B32B 7/12* (2013.01); *B32B 27/08* (2013.01); *B32B 27/20* (2013.01); *B32B 27/34* (2013.01); *B32B 37/1207* (2013.01); *B32B 37/182* (2013.01); *B32B 38/00* (2013.01); *B29C 65/10* (2013.01); *B29C 65/1409* (2013.01); *B29C 66/8246* (2013.01); *B29C 66/8322* (2013.01); *B29C 66/919* (2013.01); *B29K 2077/00* (2013.01); *B29K 2105/243* (2013.01); *B29K 2307/04* (2013.01); *B29K 2995/0086* (2013.01); *B29L 2031/3005* (2013.01); *B29L 2031/3055* (2013.01); *B29L 2031/3067* (2013.01); *B29L 2031/3076* (2013.01); *B32B 2037/1215* (2013.01); *B32B 2037/1269* (2013.01); *B32B 2038/0096* (2013.01); *B32B 2250/02* (2013.01); *B32B 2250/24* (2013.01); *B32B 2262/106* (2013.01); *B32B 2305/30* (2013.01); *B32B 2305/72* (2013.01); *B32B 2305/74* (2013.01); *B32B 2307/552* (2013.01); *B32B 2377/00* (2013.01); *B32B 2605/08* (2013.01); *B62D 65/02* (2013.01)

(58) Field of Classification Search
CPC .......... B32B 2305/74; B32B 2307/552; B32B 2377/00; B32B 2605/08; B62D 65/02
See application file for complete search history.

(56) References Cited

U.S. PATENT DOCUMENTS

| | | | | |
|---|---|---|---|---|
| 2013/0273312 A1* | 10/2013 | Campbell | ................ | B32B 7/08 428/137 |
| 2013/0273314 A1* | 10/2013 | Campbell | ................ | B32B 7/08 428/138 |

* cited by examiner

RIVET BONDING WORKPIECE STACK-UPS
HAVING ONE OR MORE POLYMER
COMPOSITE WORKPIECES

INTRODUCTION

The present disclosure relates generally to rivet bonding and, more particularly, to rivet bonding a workpiece stack-up that includes one or more polymer composite workpieces.

Rivet bonding is a process employed by a number of industries to join together two or more workpieces. In general, rivet bonding joins workpieces together by both adhesive bonding and riveting. The automotive industry, for example, uses rivet bonding to join together workpieces during the manufacture of truck beds, as well as to join together other vehicle components and structures. In the truck bed example, a number of rivet bonds are set at locations around the truck bed to secure it in place. Moreover, rivet bonding is becoming increasingly common in instances in which lighter weight materials—such as polymer composites—are incorporated into more and more products of manufacture, whether those products are automobiles, aircraft, watercraft, or something else.

SUMMARY

In an embodiment, a method of rivet bonding a workpiece stack-up with one or more polymer composite workpieces may include several steps. One step involves applying an adhesive on one or more surfaces of the workpiece stack-up. Another step involves bringing workpieces of the workpiece stack-up together with the adhesive situated therebetween. Another step involves curing the adhesive to a partially-cured state. Yet another step involves installing a rivet through the workpiece stack-up and through the adhesive while the adhesive is in the partially-cured state. And yet another step involves curing the adhesive after rivet installation to a fully-cured state.

In an embodiment, the one or more polymer composite workpieces includes a first carbon fiber composite workpiece and a second carbon fiber composite workpiece.

In an embodiment, installing the rivet involves the use of self-piercing rivets.

In an embodiment, installing the rivet involves cutting a hole through the workpiece stack-up and through the adhesive while the adhesive is in the partially-cured state.

In an embodiment, installing the rivet involves inserting the rivet through the hole and swaging a collar to a stem of the rivet.

In an embodiment, a ratio of lap shear strength of the adhesive in the partially-cured state to lap shear strength of the adhesive in the fully-cured state is less than approximately 70 percent (%).

In an embodiment, the ratio of lap shear strength of the adhesive in the partially-cured state to lap shear strength of the adhesive in the fully-cured state is within a range of approximately 60 percent (%) to 70 percent (%).

In an embodiment, a damper is situated between the rivet and workpiece stack-up amid installation of the rivet in order to dissipate impact force of rivet installation thereat.

In an embodiment, the damper is one or more cushion members carried by a stem of the rivet, carried by a collar of the rivet, or carried by both the stem and the collar.

In an embodiment, installing the rivet involves lengthening impact force of rivet installation over time.

In an embodiment, lengthening impact force of rivet installation over time is effected by way of servo control.

In an embodiment, a method of rivet bonding a workpiece stack-up with one or more polymer composite workpieces may include several steps. One step involves applying an adhesive on one or more surfaces of the workpiece stack-up. Another step involves bringing workpieces of the workpiece stack-up together with the adhesive situated therebetween. Another step involves curing the adhesive to a partially-cured state. A ratio of lap shear strength of the adhesive in the partially-cured state to lap shear strength of the adhesive in a fully-cured state is less than approximately 70 percent (%). Yet another step involves installing a rivet through the workpiece stack-up and through the adhesive while the adhesive is in the partially-cured state. And yet another step involves curing the adhesive after rivet installation to a fully-cured state.

In an embodiment, another step of the method involves drilling a hole through the workpiece stack-up and through the adhesive while the adhesive is in the partially-cured state.

In an embodiment, installing the rivet involves the use of self-piercing rivets.

In an embodiment, curing the adhesive after rivet installation to a fully-cured state involves allowing the adhesive to harden to the fully-cured state in ambient conditions.

In an embodiment, one or more cushion members are carried by a stem of the rivet, carried by a collar of the rivet, or carried by both the stem and the collar. The cushion member(s) dissipate impact force of rivet installation.

In an embodiment, installing the rivet through the workpiece stack-up and through the adhesive involves servo control in order to lengthen impact force of rivet installation over time.

In an embodiment, a method of rivet bonding a workpiece stack-up with one or more polymer composite workpieces may include several steps. One step involves applying an adhesive on one or more surfaces of the workpiece stack-up. Another step involves bringing workpieces of the workpiece stack-up together with the adhesive situated therebetween. Another step involves curing the adhesive to a partially-cured state. A ratio of lap shear strength of the adhesive in the partially-cured state to lap shear strength of the adhesive in a fully-cured state is less than approximately 70 percent (%). Yet another step involves cutting a hole through the workpiece stack-up while the adhesive is in the partially-cured state. Another step involves swaging a collar to a stem of the inserted rivet while the adhesive is in the partially-cured state. And yet another step involves curing the adhesive to a fully-cured state after rivet insertion and after collar swaging.

In an embodiment, one or more cushion members are carried by a stem of the rivet, carried by a collar of the rivet, or carried by both the stem and the collar. The cushion member(s) dissipate impact force of rivet installation.

In an embodiment, inserting the rivet through the hole in the workpiece stack-up involves servo control in order to lengthen impact force of rivet insertion over time.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

Multiple embodiments of a method of rivet bonding workpiece stack-ups are presented in the figures and described below. The methods resolve shortcomings encountered when the workpiece stack-ups include one or more polymer composite workpieces. The methods strengthen rivet-bonded joints by minimizing or altogether precluding fracture, cracking, delamination, or a combination thereof, at the joints that might otherwise occur amid rivet installation and that may weaken the rivet-bonded joints. Overall quality of the rivet-bonded joints is hence improved. While the methods are described below in the context of automotive components and structures, skilled artisans should appreciate that the methods can be employed in other contexts such as aerospace, marine, railway, building construction, and industrial equipment applications, among others.

Figure 1:
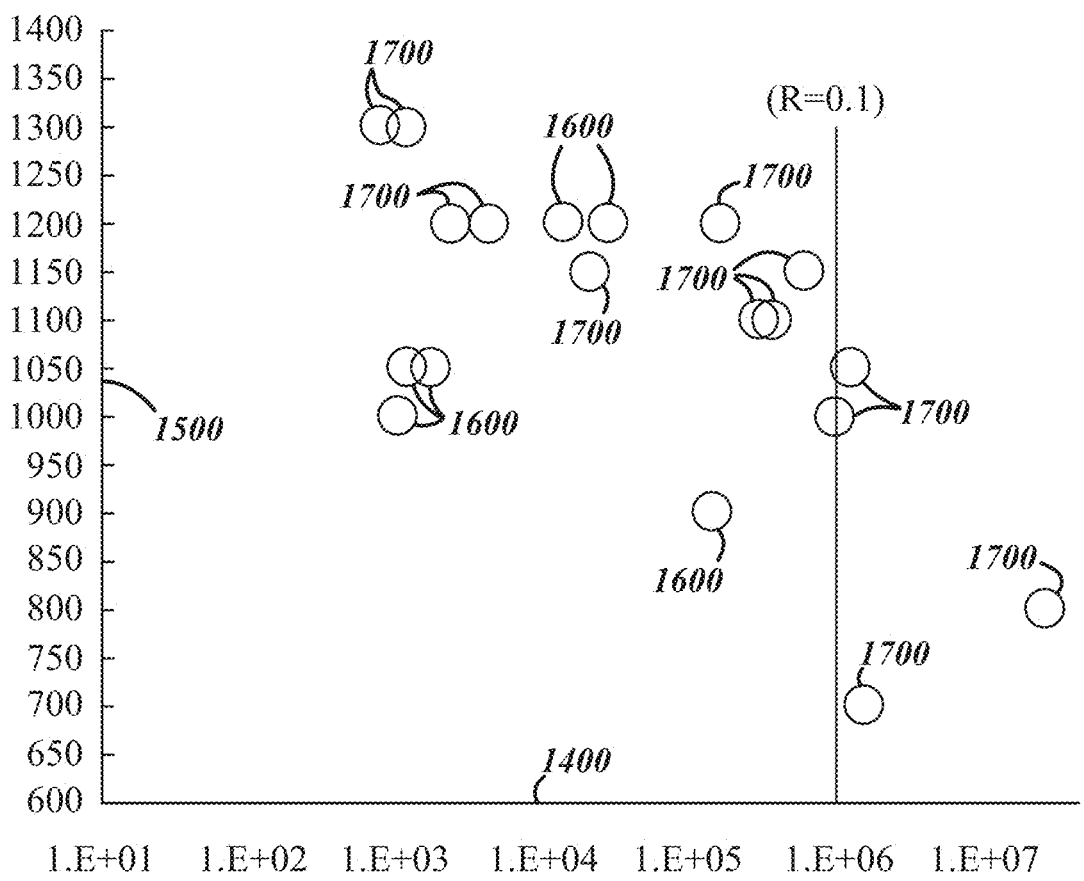
FIG. 1 is a graph showing fatigue resistance of previously-known rivet-bonded joints and riveted joints, with fatigue life cycles denoted on the X-axis and applied load in pounds (lb.) denoted on the Y-axis.
Figure 5:
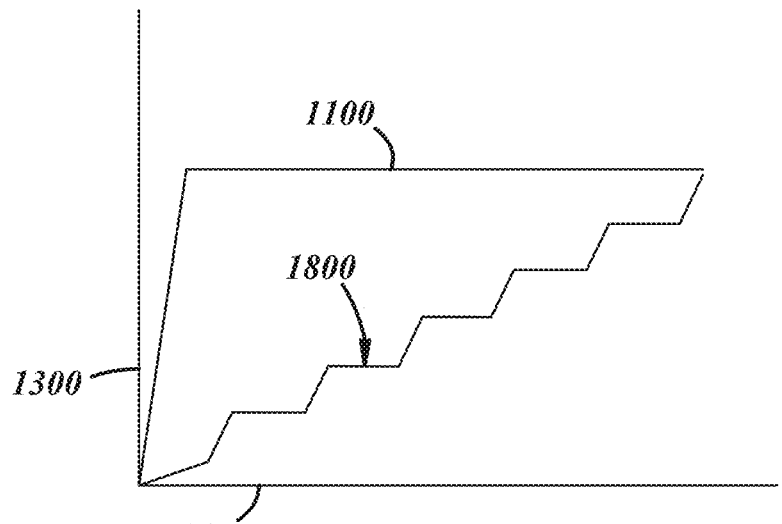
FIG. 5 is a graph showing a lengthened impact force of rivet installation over time, with time denoted on the X-axis and force denoted on the Y-axis.

In a previously-known rivet bonding approach, a pair of polymer composite workpieces are stacked together with an adhesive disposed between the workpieces. The adhesive is fully cured and set aside in air to cool, uniting the polymer composite workpieces. After fully cured and cooled, a rivet is fastened through the polymer composite workpieces and through the fully cured and cooled adhesive. The profile of impact force of rivet fastening over time for this previously-known approach is shown in FIG. 5 by reference numeral 1100, with time denoted on an X-axis 1200 and force denoted on a Y-axis 1300. The profile 1100 demonstrates a rather sharp increase in force that is exerted swiftly. The previously-known rivet bonding approach could prove suitable in certain cases; indeed, it has been found that the quasi-static strength (in pounds for joint dimensions: 125 millimeters (mm) (length) by (x) 38 mm (width) coupons with 23 mm of overlap), or lap-shear strength, of a rivet-bonded joint formed by the previously-known approach in carbon fiber composite workpieces is measurably more than the static strength of a rivet-only joint lacking adhesive formed in carbon fiber composite workpieces. But, and referring now to FIG. 1, it has further been found these previously-known rivet-bonded joints do not always outperform rivet-only joints in fatigue resistance durability testing. In the graph of FIG. 1, fatigue life cycles are denoted on an X-axis 1400, and applied load in pounds (lb.) is denoted on a Y-axis 1500. Rivet-bonded joints are shown by reference numerals 1600, and rivet-only joints are shown by reference numerals 1700. In this example durability testing, rivet-bonded joints 1600 and rivet-only joints 1700 were subjected to different loads at different times; the testing involved the use of a servo-hydraulic testing machine by MTS Systems Corporation of Eden Prairie, Minn. U.S.A.; testing was conducted with the condition of constant load amplitude control; the cyclic loading was a sinusoidal waveform with the load ratio of R=0.1, where R is the ratio of minimum load to maximum load, under the frequency of 5 hertz (Hz); fatigue life of the joints were determined by the cycles when the joints were completely separated. As demonstrated in the graph, the rivet-only joints 1700 more consistently endured the testing than the rivet-bonded joints 1600. The rivet-only joints 1700 located to the right of the vertical line (R=0.1) were joints that endured the testing without failure and in which the testing was ceased. Of course, other testing may yield other results.

Figure 2:
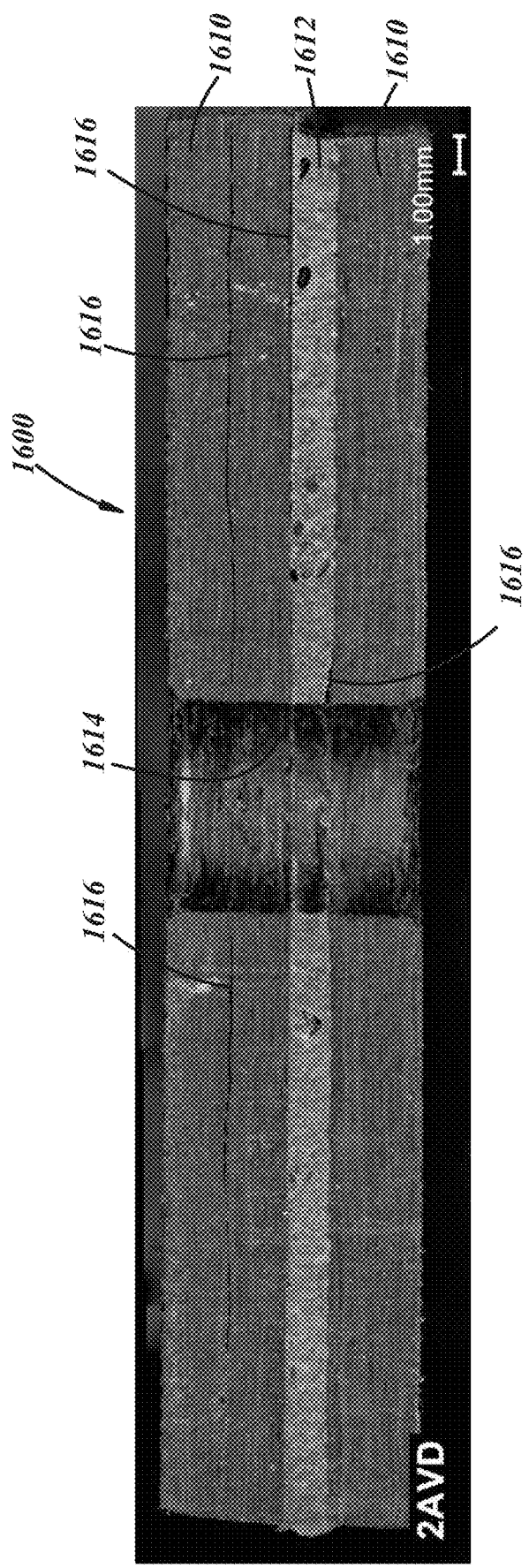
FIG. 2 is a microstructure of a previously-known rivet-bonded joint that was subjected to fatigue resistance testing.

Without wishing to be confined to a particular theory of causation, it is currently believed that the underperformance in fatigue resistance durability of the tested rivet-bonded joints 1600 is due to fracture, cracking, delamination, or a combination thereof, induced at the rivet-bonded joints 1600 by the impact force exerted from rivet fastening. The microstructure of FIG. 2 is representative of a cross-section of a rivet-bonded joint 1600 prepared by the previously-known rivet bonding approach. In FIG. 2, a pair of carbon fiber composite workpieces 1610 are united together via a fully cured and cooled adhesive 1612, with a hole 1614 through which a rivet was fastened after the fully cured and cooled condition of the adhesive was established. Cracking or delamination 1616—both in the carbon fiber composite workpieces 1610 and at an adhesive-to-workpiece interface—is observed in the microstructure. It is thought that this cracking/delamination 1616 was induced by the impact force exerted from rivet fastening, as similar cracking was not observed in a microstructure image of an adhesive-only joint prior to rivet fastening.

Figure 3:
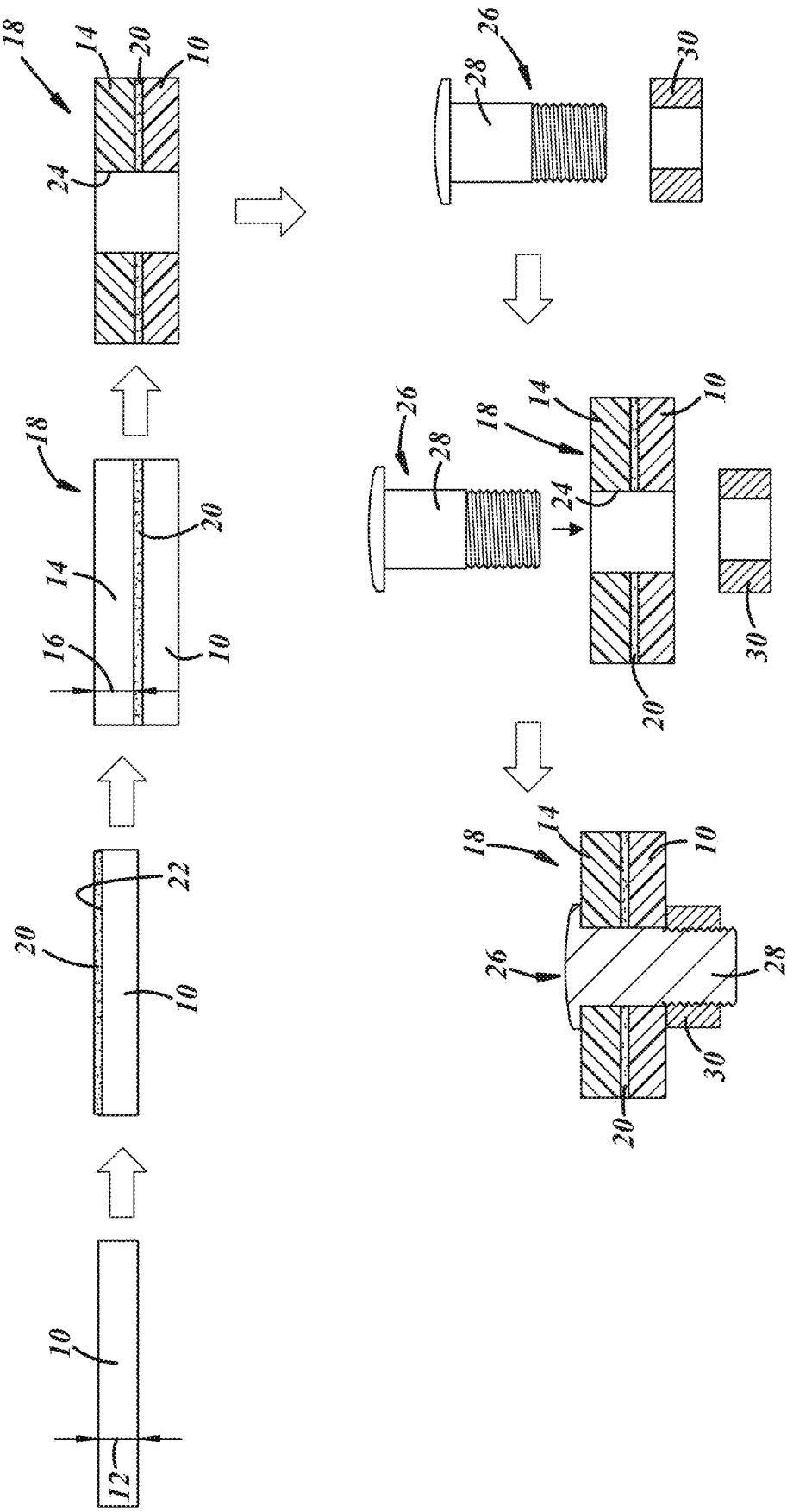
FIG. 3 depicts an embodiment of a method of rivet bonding a workpiece stack-up that includes one or more polymer composite workpieces.
Figure 4:
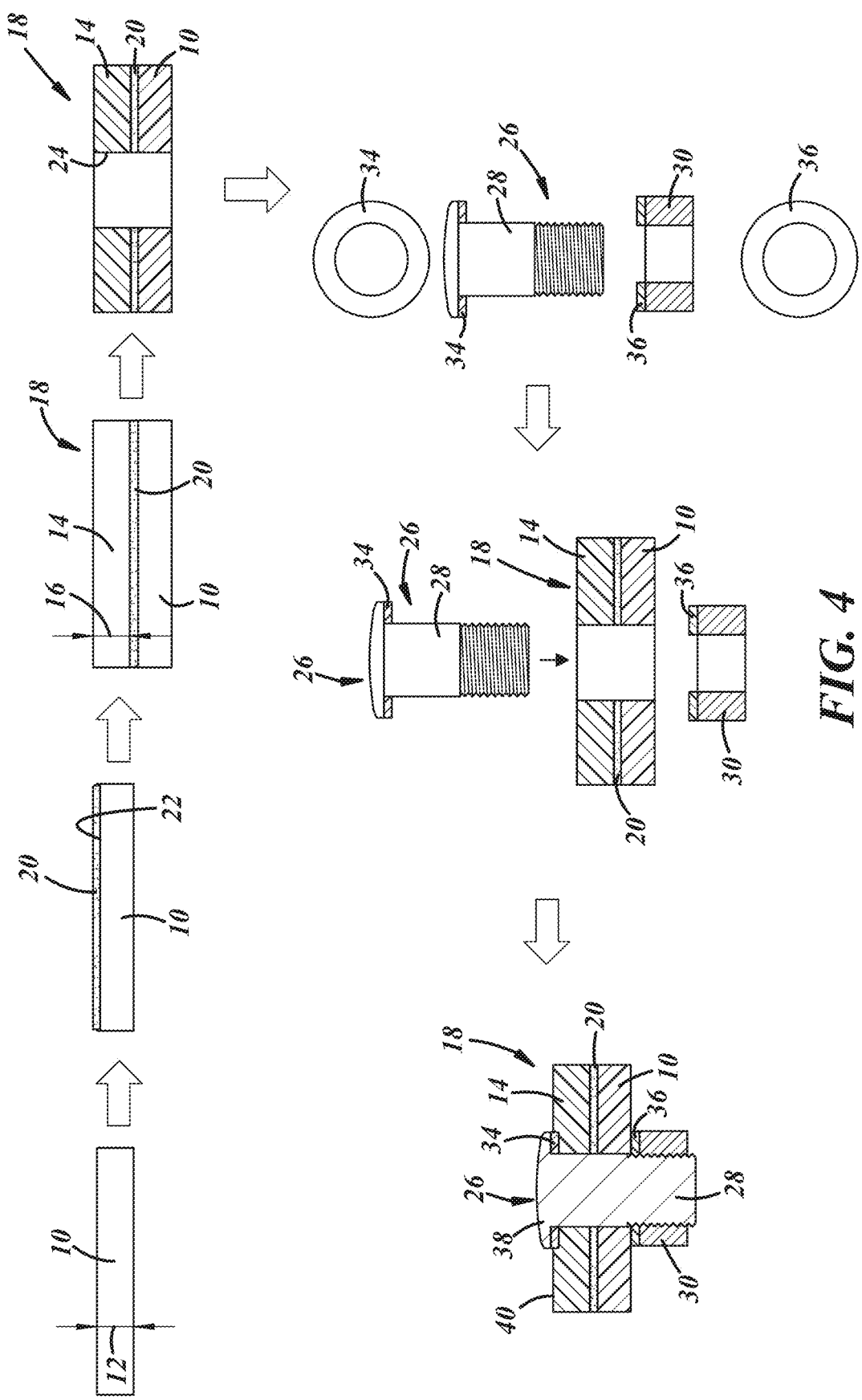
FIG. 4 depicts another embodiment of a method of rivet bonding a workpiece stack-up that includes one or more polymer composite workpieces.

To resolve these shortcomings and minimize and, in some cases, altogether preclude this observed cracking—as well as minimize or preclude fracturing and delamination—embodiments of a method of rivet bonding are presented by FIGS. 3-5. The methods strengthen rivet-bonded joints and improve the overall quality of the rivet-bonded joints. In the embodiment of FIG. 3, a first polymer composite workpiece 10 may be a workpiece employed in the manufacture of an automotive component or structure, such as a truck bed. The first polymer composite workpiece 10 can be composed of different polymer composite materials made of a polymer matrix and a reinforcement bound by the polymer matrix. In a specific example, the first polymer composite workpiece 10 is a carbon fiber composite workpiece of a Nylon 6 plastic with 30 percent (%) by weight of carbon fiber. The first polymer composite workpiece 10 can have a thickness dimension 12 that ranges between approximately 1.0-4.0 millimeters (mm); other thickness dimensions and ranges are possible. Furthermore, a second polymer composite workpiece 14 is also provided in the embodiment of FIG. 3. Like the first polymer composite workpiece 10, the second polymer composite workpiece 14 may be a workpiece employed in the manufacture of an automotive component or structure, such as a truck bed. The second polymer composite workpiece 14 can be composed of different polymer composite materials made of a polymer matrix and a reinforcement bound by the polymer matrix. In a specific example, the second polymer composite workpiece 14 is a carbon fiber composite workpiece of a Nylon 6 plastic with 30 percent (%) by weight of carbon fiber. The second polymer composite workpiece 14 can have a thickness dimension 16 that ranges between approximately 1.0-4.0 millimeters (mm); other thickness dimensions and ranges are possible. In an embodiment, the first and second polymer composite workpieces 10, 14 do not necessarily have to be composed of the same materials, nor do the workpieces have to possess the same thicknesses. Together, the first and second polymer composite workpieces 10, 14 make up a workpiece stack-up 18. Still, in other embodiments not depicted in the figures and depending on the application, the workpiece stack-up 18 can include more than two workpieces such as three workpieces or four workpieces.

Still referring to FIG. 3, in one step of this method an adhesive 20 is applied over a surface 22 of the first polymer composite workpiece 10. The adhesive 20 is applied on an area or more of a site of subsequent rivet installation. The adhesive 20 could also be applied to other surfaces of the workpiece stack-up 18, including on a surface of the second polymer composite workpiece 14. The adhesive 20 can have different compositions in different embodiments, and can be of different adhesive types; indeed, the exact composition and exact type may be dictated by the composition of the associated workpieces, among other possible influences. In a specific embodiment, the adhesive 20 is a two-part viscous polyurethane-based adhesive, an example of which is known by the product name Pliogrip™ 8500 and supplied by company Ashland Inc. of Ashland, Ky. U.S.A.; other products and other suppliers are possible. In a fully-cured state, the adhesive 20 can have a thickness dimension that ranges between approximately 0.2-2.0 mm; other thickness dimensions and ranges are possible.

In another step of this method, and after the adhesive 20 is applied but prior to curing, the first and second polymer composite workpieces 10, 14 are brought together and married in an overlapping configuration. The adhesive 20 is sandwiched and situated between the first and second polymer composite workpieces 10, 14, as depicted in FIG. 3. In the overlapping configuration, the adhesive 20 is then cured to a partially-cured state of hardening. The partially-cured state is an established condition of curing that is less than a fully-cured state. Indeed, the precise condition of curing that constitutes a partially-cured state may vary in different embodiments and may be dependent upon the composition and type of the adhesive 20. In at least some embodiments, the partially-cured state is a condition of curing in which the dimensional accuracy of the adhesive 20 and the stack-up 18 is generally maintained, and in which the green strength of the adhesive 20 that holds the first and second polymer composite workpieces 10, 14 together prior to fully-curing is generally maintained. Moreover, the curing technique carried out to effect a particular state of curing, whether partial or more, may vary in different embodiments and may similarly be dependent upon the composition and type of the adhesive 20. In the embodiment of the adhesive 20 being a two-part viscous polyurethane-based adhesive, the curing technique carried out to establish a partially-cured state can involve heating (e.g., induction heating, light heating, use of a heating plate, or another type of heating), cooling in ambient conditions, or a combination of heating and cooling.

Yet another step of the method of FIG. 3 involves rivet installation. The precise rivet installation procedure, and steps in that procedure, may vary in different embodiments and may be dependent upon the riveting technique carried out. For example, rivet installation in this step may utilize self-piercing rivets, blind rivets, or rivet nuts, among other possible riveting procedures and techniques. In the embodiment of FIG. 3, the rivet installation procedure includes cutting a hole 24 through the first and second polymer composite workpieces 10, 14 and through the adhesive 20. The cutting step is performed immediately after the adhesive 20 is cured to the partially-cured state of hardening, as previously described, and while the adhesive 20 is still in the partially-cured state. In an example, the cutting is executed by drilling the hole 24 through the first and second polymer composite workpieces 10, 14 and through the adhesive 20. A rivet 26 is then installed in the hole 24, again while the adhesive 20 is still in the partially-cured state. A stem 28 of the rivet 26 is inserted into and received by the hole 24, and a collar 30 is swaged into pin grooves of the stem 28. In a specific example, the rivet installation procedure utilizes the product known as the Avdelok® lockbolt supplied by Stanley Engineered Fastening of New Britain, Conn. U.S.A.; other products and other suppliers are possible.

Still referring to FIG. 3, in a last step of the method of rivet bonding in this embodiment, the partially-cured and riveted joint is cured to a fully-cured state of hardening. The fully-cured state is an established condition of curing that finally joins the first and second polymer composite workpieces 10, 14 together via the adhesive 20. As with partial curing, the curing technique carried out to effect the fully-cured state may vary in different embodiments and may be dependent upon the composition and type of the adhesive 20. In the embodiment of the adhesive 20 being a two-part viscous polyurethane-based adhesive, the curing technique carried out to establish the fully-cured state can involve heating (e.g., induction heating, convective heating, contact heating, or another type of heating), cooling in ambient conditions, or a combination of heating and cooling.

Figure 6:
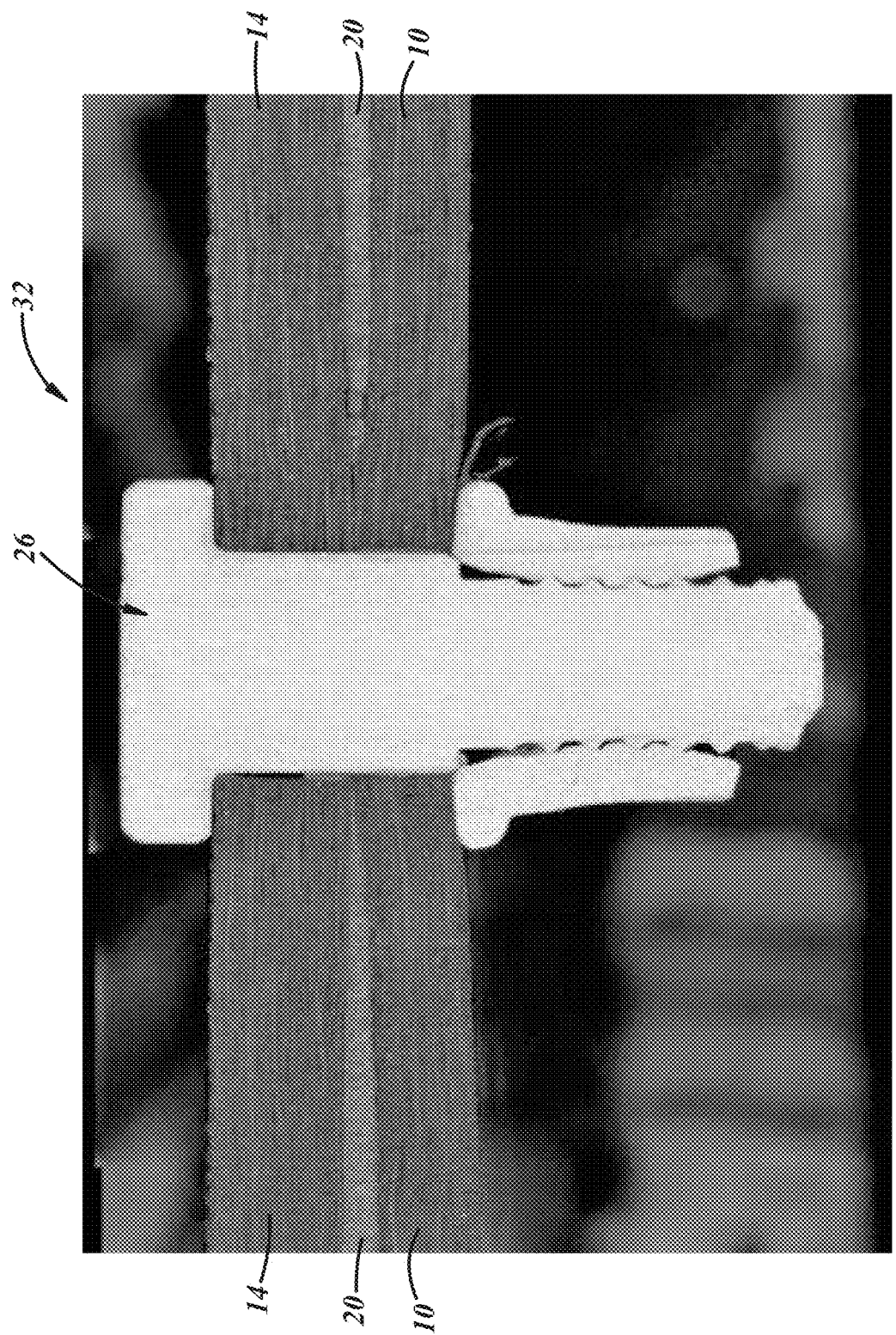
FIG. 6 is a microstructure of a rivet-bonded joint formed in accordance with the embodiment of the method presented in FIG. 3.

Unlike the previously-known rivet bonding approach, the method of rivet bonding of FIG. 3 has been shown not to result in fracture, cracking, and/or delamination. It is currently thought that the partially-cured adhesive 20 may furnish somewhat of a cushioning behavior that takes-in some of the impact force exerted from rivet installation, thereby minimizing or altogether precluding cracking, fracturing, and/or delamination. It may also be that the partially-cured state of the adhesive 20 is a condition of curing that is less susceptible to fracture, cracking, and/or delamination. The microstructure of FIG. 6 is representative of a rivet-bonded joint 32 prepared by the rivet bonding method of FIG. 3. In FIG. 6, the first and second polymer composite workpieces 10, 14 are carbon fiber composite workpieces of a Nylon 6 plastic with 30% by weight of carbon fiber, and the adhesive 20 is a two-part viscous polyurethane-based adhesive. The adhesive 20 was heated in an oven at approximately 300 degrees Fahrenheit (° F.) for 30 seconds, and then allowed to cool in ambient conditions for approximately 30 minutes; this condition constituted the established partially-cured state. Then, the rivet 26 was installed, as described above with reference to FIG. 3, and subsequently fully cured. As can be observed from the microstructure of FIG. 6, while the adhesive 20 underwent an amount of compression immediately adjacent the rivet 26, no substantial cracking/delamination is evident.

Testing was conducted in order to determine the optimum extent of partially curing, while reducing the amount of compression experienced by the adhesive 20 due to rivet installation when the adhesive 20 is less than fully-cured. In the example testing conducted, the first and second polymer composite workpieces 10, 14 were carbon fiber composite workpieces of a Nylon 6 plastic with 30% by weight of carbon fiber, and the adhesive 20 was a two-part viscous polyurethane-based adhesive sandwiched therebetween. The partially-cured state of hardening was established by convective oven heating administered to the adhesive 20, and then the adhesive 20 was subjected to various durations of cooling in ambient conditions. In a first trial, the adhesive 20 was induction heated at approximately 300 degrees Fahrenheit (° F.) for 2 minutes and then allowed to cool in ambient conditions for approximately 3 minutes; this condition constitutes the established partially-cured state. After cooling, a rivet was installed while the adhesive 20 was still in the partially-cured state. The rivet installation involved here was similar to the rivet installation described above with reference to FIG. 3. After rivet installation, the adhesive 20 was further cured to a fully-cured state, again as described above with reference to FIG. 3. Examination of the microstructure of the resulting rivet-bonded joint revealed no observable cracking. Furthermore, for the first trial, the lap-shear strength of the adhesive 20 in the partially-cured state (and without rivet installation) was tested and compared to the lap-shear strength of the adhesive 20 in its fully-cured state (and without rivet installation). In the example lap-shear strength testing performed here, specimens were loaded to complete fracture in a tensile tester per the ASTM International standard D1002-2001. The partially-cured lap-shear strength was divided by the fully-cured lap-shear strength in order to arrive at a percentage or ratio between the two. In the first trial, the yielded percentage was 19%.

In a second trial, the adhesive 20 was induction heated at approximately 300 degrees Fahrenheit (° F.) for 2 minutes and then allowed to cool in ambient conditions for approximately 10 minutes; this condition constitutes the established partially-cured state. After cooling, a rivet was installed while the adhesive 20 was still in the partially-cured state. The rivet installation involved here was similar to the rivet installation described above with reference to FIG. 3. After rivet installation, the adhesive 20 was further cured to a fully-cured state, again as described above with reference to FIG. 3. Examination of the microstructure of the resulting rivet-bonded joint revealed no observable cracking. Furthermore, for the second trial, the lap-shear strength of the adhesive 20 in the partially-cured state (and before rivet installation) was tested and compared to the lap-shear strength of the adhesive 20 in its fully-cured state (and without rivet installation). In the example lap-shear strength testing performed here, specimens were loaded to complete fracture in a tensile tester per the ASTM International standard D1002-2001. The partially-cured lap-shear strength was divided by the fully-cured lap-shear strength in order to arrive at a percentage or ratio between the two. In the second trial, the yielded percentage was 61.8%.

In a third trial, the adhesive 20 was induction heated at approximately 300 degrees Fahrenheit (° F.) for 2 minutes and then allowed to cool in ambient conditions for approximately 30 minutes; this condition constitutes the established partially-cured state. After cooling, a rivet was installed while the adhesive 20 was still in the partially-cured state. The rivet installation involved here was similar to the rivet installation described above with reference to FIG. 3. After rivet installation, the adhesive 20 was further cured to a fully-cured state, again as described above with reference to FIG. 3. Examination of the microstructure of the resulting rivet-bonded joint revealed no observable cracking. Furthermore, for the third trial, the lap-shear strength of the adhesive 20 in the partially-cured state (and before rivet installation) was tested and compared to the lap-shear strength of the adhesive 20 in its fully-cured state (and without rivet installation). In the example lap-shear strength testing performed here, specimens were loaded to complete fracture in a tensile tester per the ASTM International standard D1002-2001. The partially-cured lap-shear strength was divided by the fully-cured lap-shear strength in order to arrive at a percentage or ratio between the two. In the third trial, the yielded percentage was 66.5%.

Lastly, in a fourth trial, the adhesive 20 was induction heated at approximately 300 degrees Fahrenheit (° F.) for 2 minutes and then allowed to cool in ambient conditions for approximately 60 minutes; this condition constitutes the established partially-cured state. After cooling, a rivet was installed while the adhesive 20 was still in the partially-cured state. The rivet installation involved here was similar to the rivet installation described above with reference to FIG. 3. After rivet installation, the adhesive 20 was further cured to a fully-cured state, again as described above with reference to FIG. 3. Unlike the previous trials, examination of the microstructure of the resulting rivet-bonded joint in the fourth trial revealed observable cracking. Furthermore, for the fourth trial, the lap-shear strength of the adhesive 20 in the partially-cured state (and before rivet installation) was tested and compared to the lap-shear strength of the adhesive 20 in its fully-cured state (and without rivet installation). In the example lap-shear strength testing performed here, specimens were loaded to complete fracture in a tensile tester per the ASTM International standard D1002-2001. The partially-cured lap-shear strength was divided by the fully-cured lap-shear strength in order to arrive at a percentage or ratio between the two. In the fourth trial, the yielded percentage was 79.3%.

Based at least in part on the testing conducted and the yielded results, it has been determined that the optimum ratio of partially-cured lap shear strength to fully-cured lap shear strength that minimizes or altogether precludes observable fracture, cracking, and/or delamination is a ratio that is less than approximately 70%; or, more narrowly, is a ratio within an approximate range of 60% to 70%.

Referring now to FIG. 4, in another embodiment of a method of rivet bonding one or more dampers 34, 36 are introduced in the method in order to minimize or altogether preclude fracture, cracking, and/or delamination. The damper(s) 34, 36 serve to furnish a cushioning behavior that takes-in some of the impact force exerted from rivet installation and, in this way, lengthen the exerted impact force over a time period that is greater than it otherwise would be. The damper(s) 34, 36 can have different forms in different embodiments and can be incorporated into the method of rivet bonding in different ways. In the embodiment of FIG. 4, for instance, the damper takes the form of a first cushion member 34 and a second cushion member 36. The first and second cushion members 34, 36 can be composed of a plastic or rubber material or the like, and can have a ring-shape as illustrated in FIG. 4. In this embodiment, the first and second cushion members 34, 36 are incorporated into the step of rivet installation. The first cushion member 34 is carried by the stem 28 of the rivet 26 and, when installed, is seated and sandwiched between a head 38 of the rivet 26 and an exterior surface 40 of the second polymer composite workpiece 14. Similarly, the second cushion member 36 is carried by the collar 30 of the rivet 26 and, when installed, is seated and sandwiched between the collar 30 and the first polymer composite workpiece 10. Still, in other embodiments, only the first cushion member 34 need be provided, or only the second cushion member 36 need be provided; indeed, testing has shown that use of only the second cushion member 36 (i.e., absent the first cushion member 34) with adhesive that is fully-cured prior to rivet installation minimizes or altogether precludes fracture, cracking, and/or delamination. In either of these locations, the first and/or second cushion member 34, 36 can prevent galvanic corrosion that might otherwise develop between the workpiece 10, 14 and the rivet 26 in application thereat. Furthermore, in this embodiment the adhesive 20 can be partially cured or fully cured prior to rivet installation since the first and/or second cushion members 34, 36 serve the cushioning functionality.

In yet another embodiment, a method of rivet bonding minimizes or altogether precludes fracture, cracking, and/or delamination by lengthening or extending the impact force exerted from rivet installation over a time period that is greater than it otherwise would be by implementation of servo control amid rivet installation. This implementation can take different forms in different embodiments. In the example of FIG. 5, a servo controller manages the impact force of a rivet bonding gun used to insert rivets. The impact force is controlled to exhibit a profile 1800 as depicted in the graph. Compared to the profile 1100 of the previously-known approach, the profile 1800 has a step-wise force exerted over a more extended time period. The profile 1800 can vary in other embodiments. Furthermore, in this embodiment the adhesive 20 can be partially cured or fully cured prior to rivet installation since the implemented servo control lengthens the exerted impact force.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of rivet bonding a workpiece stack-up that comprises at least one polymer composite workpiece, the method comprising:
    applying an adhesive on at least one surface of the workpiece stack-up;
    bringing workpieces of the workpiece stack-up together with the adhesive situated between the workpieces;
    curing the adhesive to a partially-cured state;
    installing a rivet through the workpiece stack-up and through the adhesive while the adhesive is in the partially-cured state; and
    curing the adhesive after rivet installation to a fully-cured state.

2. The method as set forth in claim 1, wherein the at least one polymer composite workpiece includes a first carbon fiber composite workpiece and a second carbon fiber composite workpiece.

3. The method as set forth in claim 1, wherein installing the rivet involves the use of self-piercing rivets.

4. The method as set forth in claim 1, wherein installing the rivet involves cutting a hole through the workpiece stack-up and through the adhesive while the adhesive is in the partially-cured state.

5. The method as set forth in claim 4, wherein installing the rivet involves inserting the rivet through the hole and swaging a collar to a stem of the rivet.

6. The method as set forth in claim 1, wherein a ratio of lap shear strength of the adhesive in the partially-cured state to lap shear strength of the adhesive in the fully-cured state is less than approximately 70 percent (%).

7. The method as set forth in claim 6, wherein the ratio of lap shear strength of the adhesive in the partially-cured state to lap shear strength of the adhesive in the fully-cured state is within a range of approximately 60 percent (%) to 70 percent (%).

8. The method as set forth in claim 1, wherein a damper is situated between the rivet and workpiece stack-up amid installation of the rivet in order to dissipate impact force of rivet installation thereat.

9. The method as set forth in claim 8, wherein the damper is at least one cushion member carried by a stem of the rivet, carried by a collar of the rivet, or carried by both the stem and the collar.

10. The method as set forth in claim 1, wherein installing the rivet involves lengthening impact force of rivet installation over time.

11. The method as set forth in claim 10, wherein lengthening impact force of rivet installation over time is effected via servo control.

12. A method of rivet bonding a workpiece stack-up that comprises at least one polymer composite workpiece, the method comprising:
    applying an adhesive on at least one surface of the workpiece stack-up;
    bringing workpieces of the workpiece stack-up together with the adhesive situated between the workpieces;
    curing the adhesive to a partially-cured state, wherein a ratio of lap shear strength of the adhesive in the partially-cured state to lap shear strength of the adhesive in a fully-cured state is less than approximately 70 percent (%);
    installing a rivet through the workpiece stack-up and through the adhesive while the adhesive is in the partially-cured state; and
    curing the adhesive after rivet installation to the fully-cured state.

13. The method as set forth in claim 12, further comprising the step of drilling a hole through the workpiece stack-up and through the adhesive while the adhesive is in the partially-cured state.

14. The method as set forth in claim 12, wherein installing the rivet involves the use of self-piercing rivets.

15. The method as set forth in claim 12, wherein curing the adhesive after rivet installation to a fully-cured state involves allowing the adhesive to harden to the fully-cured state in ambient conditions.

16. The method as set forth in claim 12, wherein at least one cushion member is carried by a stem of the rivet, carried by a collar of the rivet, or carried by both the stem and the collar, the at least one cushion member dissipating impact force of rivet installation.

17. The method as set forth in claim 12, wherein installing the rivet through the workpiece stack-up and through the adhesive involves servo control in order to lengthen impact force of rivet installation over time.

18. A method of rivet bonding a workpiece stack-up that comprises at least one polymer composite workpiece, the method comprising:
    applying an adhesive on at least one surface of the workpiece stack-up;

bringing workpieces of the workpiece stack-up together with the adhesive situated between the workpieces;

curing the adhesive to a partially-cured state, wherein a ratio of lap shear strength of the adhesive in the partially-cured state to lap shear strength of the adhesive in a fully-cured state is less than approximately 70 percent (%);

cutting a hole through the workpiece stack-up and through the adhesive while the adhesive is in the partially-cured state;

inserting the rivet through the hole in the workpiece stack-up while the adhesive is in the partially-cured state;

swaging a collar to a stem of the inserted rivet while the adhesive is in the partially-cured state; and curing the adhesive to a fully-cured state after rivet insertion and after collar swaging.

19. The method as set forth in claim 18, wherein at least one cushion member is carried by the stem of the rivet, carried by the collar of the rivet, or carried by both the stem and the collar, the at least one cushion member dissipating impact force of rivet insertion.

20. The method as set forth in claim 18, wherein inserting the rivet through the hole in the workpiece stack-up involves servo control in order to lengthen impact force of rivet insertion over time.

* * * * *